United States Patent
Brundobler

(10) Patent No.: US 7,065,475 B1
(45) Date of Patent: Jun. 20, 2006

(54) MODELING OPTION PRICE DYNAMICS

(75) Inventor: Stefan Brundobler, New York, NY (US)

(73) Assignee: Goldman Sachs & Co., New York, NY (US)

( * ) Notice: Subject to any disclaimer, the term of this patent is extended or adjusted under 35 U.S.C. 154(b) by 481 days.

(21) Appl. No.: 09/702,423

(22) Filed: Oct. 31, 2000

(51) Int. Cl.
G06F 17/10 (2006.01)

(52) U.S. Cl. .......................... 703/2; 705/37

(58) Field of Classification Search ............ 703/2; 705/36, 37, 400, 35, 10
See application file for complete search history.

(56) References Cited

U.S. PATENT DOCUMENTS

| | | | |
|---|---|---|---|
| 5,812,988 A * | 9/1998 | Sandretto | 705/36 |
| 6,546,375 B1 * | 4/2003 | Pang et al. | 705/37 |
| 6,625,584 B1 * | 9/2003 | Bains et al. | 705/400 |
| 6,643,631 B1 * | 11/2003 | Heyde | 706/46 |

\* cited by examiner

*Primary Examiner*—Albert W. Paladini
(74) *Attorney, Agent, or Firm*—Akin Gump Strauss Hauer & Feld, LLP

(57) ABSTRACT

This invention presents a method for pricing an option. The steps for this method include configuring a general option pricing model with parameters to conform the model to a market behavior of an underlying asset. A price for an option is then calculated using the model. The configured model can be calibrated to implied volatility data describing the current state of the market. The underlying asset can include commodity prices, interest rates, and currency exchange rates. More than one general option pricing models can be used to price the option. Additionally, correlations between the general option pricing models can be included in the calculation. The configuring of the parameters can be done through the formula:

$$\frac{dF(t, T)}{F(t, T)} = \sum_a \left[ \sum_i y_{ia} B_i(t, T) g_i(T) \right] \sigma_a(t) dz_a(t),$$

wherein F(t, T) represents the value of the underlying asset and dF(t, T) represents a change in the value of the underlying asset; a represents randomness factors; i represents an amount of mean reversion factors used in the model; t represents the current time; T represents the forward time; $y_{ia}$ represents the move shape coefficient; $B_i(t, T)$ represents the mean reversion factor; $g_i(T)$ represents the volatility adjustment factor; $\sigma_a(t)$ represents the instantaneous factor volatility; and $dz_a(t)$ represents the random increment.

9 Claims, 3 Drawing Sheets

MODELING OPTION PRICE DYNAMICS

BACKGROUND

Financial markets allow participants to modify their exposure to the future values of financial quantities (such as the price of oil, or interest rates) for which they are concerned. For example, a producer of oil can reduce his exposure to the oil price at a future time by "selling oil forward." The producer enters a forward agreement by which he commits to deliver a specified amount of oil at a future date in exchange for receiving a specified amount of money per barrel of oil. The amount of money is known as the "forward price" of oil at the time of the transaction for that future date. The producer can also purchase a put option with a strike of, for example, $20 for that date on that amount of oil. This put option gives the producer the rights to sell the amount of oil for $20 per barrel on that future date to the writer of the option. Alternatively, if the price per barrel ends up below $20, the producer could receive the difference between the price of oil per barrel and $20 for the amount of oil in question. As another example, a consumer of oil (such as an airline) could purchase, for example, a $30 strike call option on some amount of oil for a future date. This call option gives the consumer of oil the right to purchase that amount of oil at that date for $30 from the writer of the option.

The put and call options described above are simple examples of the general concept of "derivative securities" (or simply "derivatives," sometimes also referred to as "options"). A derivative security is a cash flow (or a set of cash flows) that is derived from a set of financial market quantities in whatever way the counterparties engaging in trading that derivative agree upon.

Because the payoff of derivatives is in general not known until they expire (i.e., until all market quantities that the payoff depends upon have been determined), the current value of a position in a derivative is usually not evident. Therefore, in order for financial institutions to engage in such transactions, financial institutions use mathematical models to price derivatives (i.e., to determine their current value to the counterparties). The models used for this purpose differ widely in complexity and in the various details involved, but in general they usually attempt to assign risk neutral probabilities to the various payoffs possible, and from these probabilities derive the current value.

Information such as historical volatilities and correlations can be used for guidance in the design of the model (i.e., what kind of equations to use). Furthermore, a calibration process is usually used to ensure consistency of the actual model parameters with a set of option prices observable in the market and used as a reference.

SUMMARY

The present invention relates to the valuation of options. In particular, the invention relates to the modeling of a stochastic future evolution of market forward or futures prices.

In one aspect of this invention, a method for pricing an option is presented. The steps for this method include configuring a general option pricing model with parameters to conform the model to a market behavior of an underlying asset. A price for an option is then calculated using the model. The configured model can be calibrated to implied volatility data describing the current state of the market. The underlying asset can include commodity prices, interest rates, and currency exchange rates. More than one general option pricing models can be used to price the option. Additionally, correlations between the general option pricing models can be included in the calculation.

In another aspect of this invention, the step of configuring the general option pricing model can include configuring the parameters of the model in relation to a current time and a forward time. The parameters can include a move shape coefficient describing the movement of the underlying asset dependent upon the parameters. The parameters can include a mean reversion factor describing information decay from the current time to the forward time. The mean reversion rate can be a completely free. The parameters can include a volatility adjustment factor describing volatility dependent upon the forward time. The parameters can include an instantaneous factor volatility describing instantaneous volatility dependent upon the current time. The instantaneous factor volatility can include a base value for the instantaneous factor volatility, a calibration coefficient set during the calibration of the model, and a calibration gradient determining how much each volatility is affected by the calibration coefficient. The parameters can include a random increment based on the current time. The random increment can be a Brownian random increment.

The configuring of the parameters can be done through the formula:

$$\frac{dF(t, T)}{F(t, T)} = \sum_a \left[\sum_i y_{ia} B_i(t, T) g_i(T)\right] \sigma_a(t) dz_a(t),$$

wherein F(t, T) represents the value of the underlying asset and dF(t, T) represents a change in the value of the underlying asset; i represents an amount of the mean reversion factors used in the model; t represents the current time; T represents the forward time; $y_{ia}$ represents the move shape coefficient; $B_i(t, T)$ represents the mean reversion factor; $g_i(T)$ represents the volatility adjustment factor; $\sigma_a(t)$ represents the instantaneous factor volatility; $dz_a(t)$ represents a random increment; and a represents the index enumerating the random increments $dz_a(t)$. The mean reversion rate can be calculated using the formula:

$$B_i(t, T) = \exp\left[-\int_i^T \beta_i(u) du\right],$$

wherein $\beta_i(u)$ represents a time dependency of a mean reversion rate. The instantaneous factor volatility can be calculated using the formula:

$$\rho_a(t) = \sigma_{0a}(t) + \xi(t) d\sigma_a(t),$$

wherein $\sigma_{0a}(t)$ represents a base value for the instantaneous factor volatility, $\xi(t)$ represents a calibration coefficient set during the calibration of the model, and $d\sigma_a(t)$ represents a calibration gradient determining how much each volatility is affected by the calibration coefficient.

In another aspect of this invention, the steps described above can be implemented on a computer to model the commodity using a general model. A computer system with a computer, including a memory and a processor, and executable software residing in the computer memory can be used to implement the steps described above. Finally, a computer data signal embodied in a digital data stream can be used for modeling a commodity as described in the steps above.

The details of the methodology can be found in the Detailed Description section below. The advantages of this invention may include the following:

In one or more embodiments of this invention, the forward price curve for each commodity may be modeled in its entirety, so that there is a single model for the forward prices of all expirations. This can result in a common starting point for the pricing of any derivative relating to that particular commodity as opposed to having to make up a model for each type of derivative.

In one or more embodiments of the invention, the general formula can result in flexibility in the design and set up of the model for each commodity. Each model can include a different number of factors. For example, several factors can be used to describe the type of forward price moves and how the instantaneous volatility of each factor can be calibrated to the market volatilities. This allows the user to take account of the diverse peculiarities that are observed in the dynamics of commodity prices, which affect option pricing.

In one or more embodiments of this invention, the equations describing the forward price dynamics can have a simple explicit mathematical form, allowing users to develop intuition as to the meaning of the model factors and parameters, and to tweak the model by modifying these parameters.

In one or more embodiments of this invention, the models described here can be "Markovian," meaning that an N-factor model will lead to an N-dimensional (as opposed to infinite dimensional) set of possible future price curves. This makes grid implementations and efficient Monte Carlo implementations for the pricing of specific securities possible.

Finally, in one or more, embodiments of this invention, the approach described here can also create a coherent framework for the modeling of price dynamics of commodities, currency exchange rates, interest rates, and any combination of these elements. This can allow the systematic pricing of derivative securities that are affected by all these factors.

DETAILED DESCRIPTION

The present invention relates to the valuation of derivative securities. In particular, the invention provides pricing for derivative securities using stochastic models for the dynamics of the forward price curves. These models are mean reverting, Gaussian multi-factor models. For each commodity and interest rate curve, the model can independently be set up to capture the relevant details of the dynamics in question. For commodities, these models are usually calibrated to a set of volatilities available in the market. It is also possible not to calibrate the models but instead to fully specify them. Since the underlying market parameters (such as the forward prices or exchange rates) are modeled, the models are not specific to a type of derivative. Instead, the models can be used for valuing any type of derivative that can be derived from the market prices.

Figure 1:
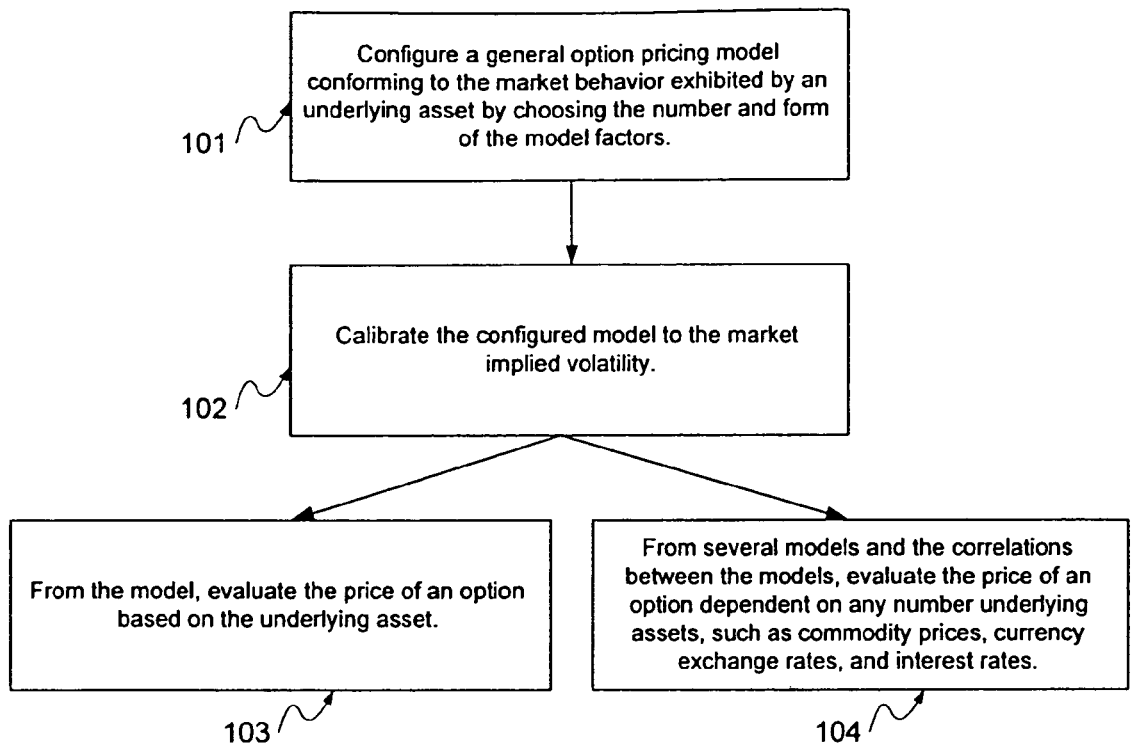
FIG. 1 is a flowchart of the commodity modeling system

Referring first to FIG. 1, a general option pricing model is configured to the market behavior exhibited by the specified underlying asset 101. The general option pricing model is a probabilistic model of the forward price dynamics. The model is configured to the market behavior, which models the specific features of the forward price dynamics of the specified underlying asset or assets. Any number of factors can be used to model the fundamental forward curve moves. This design and its parameter settings are usually modified infrequently, perhaps only a few times per year.

The configured model can then be calibrated to the market implied volatility, which is the current state of the market information based on the implied volatilities 102. To calibrate the configured model, the instantaneous factor volatilities are solved to ensure consistency with market implied volatilities. The volatilities can be implied via the use of the Black-Scholes option price formula by option prices observable in the market.

Finally, the model is used to evaluate the price of an option on a particular underlying asset 103. Any type of option or derivative security can be priced. The option can depend on future underlying asset prices in any arbitrary way as agreed upon by the counterparties. Multiple models and correlations between the models can be used to evaluate an option dependent on several underlying assets 104. The price of the option can be dependent on any number and combination of underlying assets, such as commodity prices, currency exchange rates, and interest rates.

Figure 2:
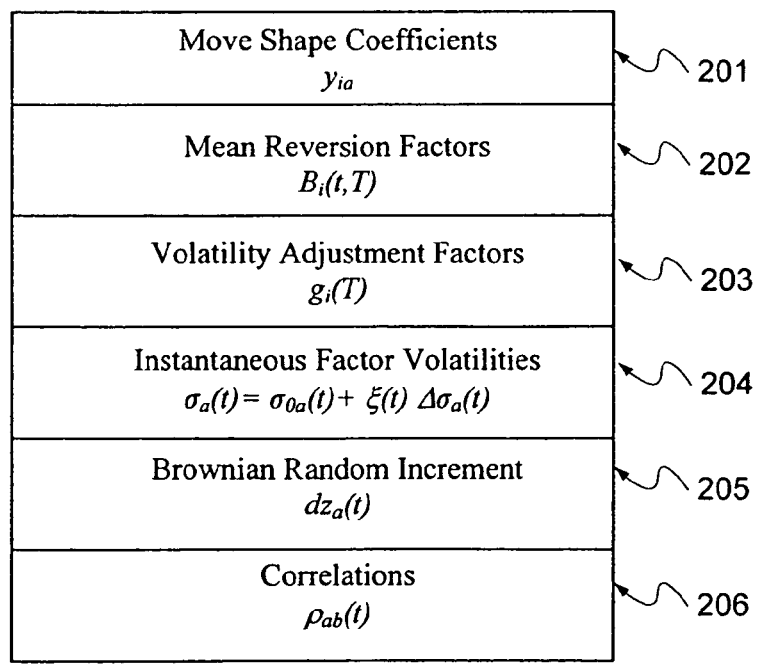
FIG. 2 shows the essential ingredients to the model design

FIG. 2 summarizes the parameters of the general option pricing model. These parameters can be set for the model to describe the dynamics of each particular forward price curve. This can be important since the better the price dynamics relevant to the value of a particular option as described by the model used, the more reliable and accurate the resulting option price can be. The adjustable parameters include the Move Shape Coefficients 201, the Mean Reversion Factors 202, the Volatility Adjustment Factors 203, the Instantaneous Factor Volatilities 204, and the Correlations 206. In addition to these parameters, the Brownian Random Increment 205 can be used to model the option price. Each of these parameters will be discussed below in relation to the general option pricing model.

The equations presented here are given as an example of an embodiment of modeling derivatives. People skilled in the art will understand that these equations can be altered without changing their use or meaning. The claims of this invention, therefore, also cover these changed equations.

In all the equations below, t represents the current or evolving time of modeling, and T represents the forward or expiration time. The forward or expiration time is the time when a forward agreement expires, i.e. when asset and payment are exchanged. $F(t, T)$ is the forward price for the underlying asset in question at time t for expiration at time T. $dF(t, T)$ denotes the incremental random change to $F(t, T)$ over the time interval dt.

Equation 1a presents an embodiment of this invention in a stochastic differential equation ("SDE"). This is the general mathematical form for the stochastic model of a single underlying asset forward price curve in this framework.

$$\frac{dF(t,T)}{F(t,T)} = \sum_{a=1}^{N}\left[\sum_{i=1}^{N} y_{ia}B_i(t,T)g_i(T)\right]\sigma_a(t)dz_a(t) \quad \text{Equation 1a}$$

where it is understood that the $dz_a(t)$ are Brownian Random Increments $$corr(dz_a(t), dz_b(t)) = \rho_{ab}(t) \quad \text{Equation 1b}$$

$$B_i(t,T) = \exp\left[-\int_t^T \beta_i(u)du\right]$$

The index a in Equation 1a represents the different independent, but generally correlated, factor moves that are being used to describe the dynamics of the forward price curve. Each factor move has its own Brownian Random Increment, $dz_a(t)$, Instantaneous Factor Volatility, $\sigma_a(t)$, and an expiry time T dependent Move Shape, $\Sigma_i y_{ia} B_i(t,T) g_i(T)$.

The Move Shape consists of the Move Shape Coeffients, $y_{ia}$, which define a linear combination of the Mean Reversion Factors, $B_i(t,T)$ and the Volatility Adjustment Factors, $g_i(T)$.

The Move Shape Coefficients allow the user to design a factor move of the desired form by selecting an appropriate linear combination of the Mean Reversion Factors and Volatility Adjustment Factors.

The Mean Reversion Factors, $B_i(t,T)$, describe how the forward curve moves based on expiry time T. The factors can be in the form of:

$$B_i(t,T) = \exp\left[-\int_t^T \beta_i(u)du\right] \quad \text{Equation 2a}$$

where $\beta$ is the mean reversion rate. The mean reversion rate can also be interpreted as a rate of information loss. Because of the mean reversion rate of Equation 2a, the model specified in Equation 1a is Markovian, i.e., it has an N-dimensional State Space. Often the Mean Reversion Rates are taken to be constant, in which case the above form simplifies to the form:

$$B_i(t,T) = \exp[-\beta_i(T-t)] \quad \text{Equation 2b}$$

The expiry time dependent Volatility Adjustment Factors, $g_i(T)$, may be used to apply T-dependent corrections to the Mean Reversion Factors. For example, one could describe seasonality of volatility using these factors. In this way, prices of underlying assets can be modeled that change across the seasons, such as the price of orange juice. These factors can sometimes allow the calibration process to find a solution that would not be available without this parameter.

The $\sigma_a(t)$ are the Instantaneous Factor Volatilities, which determine the strength or amplitude of the random move labeled by a. They can be given by:

$$\sigma_a(t) = \sigma_{0a}(t) + \xi(t) \times \Delta\sigma_a(t) \quad \text{Equation 3}$$

where the $\sigma(t)$ are determined by the calibration process so as to ensure consistency with a specified set of market term volatilities. Note that $\xi(t)$ is a piecewise constant function, with the endpoints of the respective time intervals given by the expiry dates of the market term volatilities. The $\sigma_{0a}(t)$ may be referred to as the Base Values for the Instantaneous Factor Volatilities, and the $\Delta\sigma_a(t)$ as their Calibration Gradients. The Calibration Gradients determine how much each volatility is affected by the calibration process. For example, if one of these gradients is set to zero, then a particular Factor Volatility, $\sigma_a(t)$, is not calibrated, but rather left at its base value. Finally, the $\rho_{ab}(t)$ are the Instantaneous Correlations between the Brownian Random Increments, $dz_a(t)$ and $dz_b(t)$.

To specify the model for the price of a single underlying asset, $y_{ia}$, $\beta_i(t)$, $g_i(T)$, $\sigma_{0a}(t)$, $\Delta\sigma_a(t)$, and $\rho_{ab}(t)$ can be specified. If the model is not calibrated to market volatilities, but rather simply taken as given, then $\sigma_a(t)$ can be specified, instead of the $\sigma_{0a}(t)$, $\Delta\sigma_a(t)$, and the market volatilities.

Two examples will be used to clarify this model. First, the Gabillon Model is presented. Taking the general option pricing model presented in Equation 1a and using two factors (i.e., N=2), the labels a=L, S; i=L, Y; and setting:

$$\sigma_L(t) = \sigma_L \quad \text{Equation 6}$$

$$\beta_L(u) = 0, \beta_Y(u) = \beta$$

$$g_L(T) = g_Y(T) = g(T)$$

$$y = [y_{ia}] = \begin{bmatrix} y_{LL} & y_{LS} \\ y_{YL} & y_{YS} \end{bmatrix} = \begin{bmatrix} 1 & 0 \\ -1 & 1 \end{bmatrix}$$

results in the SDE:

$$\frac{dF(t,T)}{F(t,T)} = g(T)[(1-e^{-\beta(T-t)})\sigma_L dz_L(t) + e^{-\beta(T-t)}\sigma_s(t)dz_s(t)] \quad \text{Equation 7}$$

Figure 3:
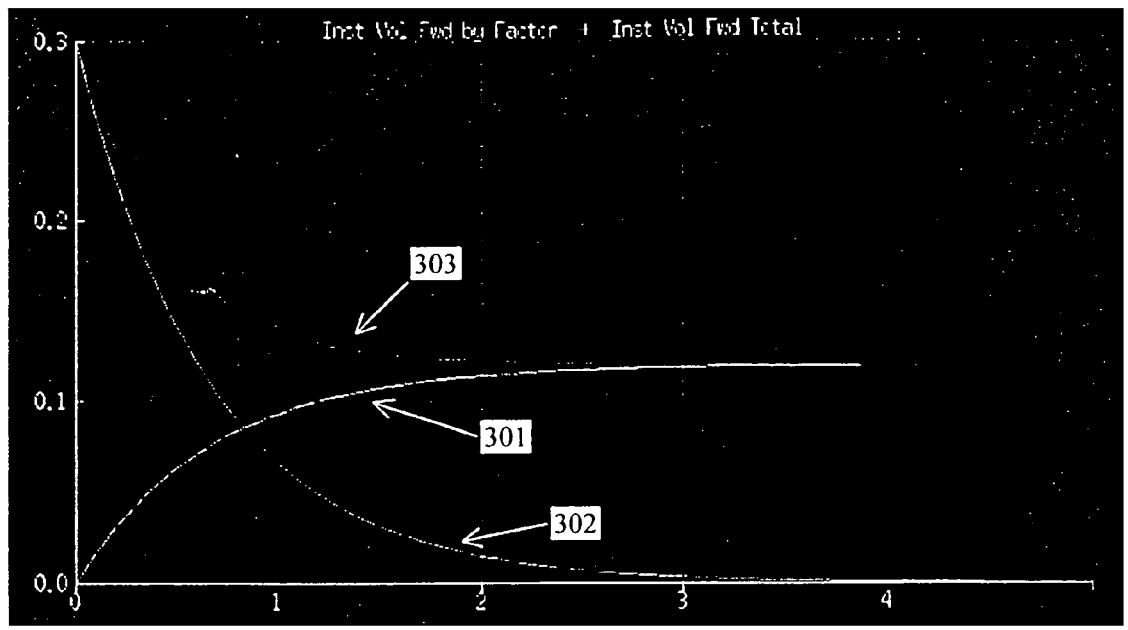
FIG. 3 illustrates the forward price moves and total instantaneous forward price volatility implied by the Gabillon type (2-factor) model design

FIG. 3 shows the factor volatility functions, $(1-e^{-\beta(T-t)})\sigma_L$ 301 and $e^{-\beta(T-t)}\sigma_s(t)$ 302, for this model and the resulting total relative forward price volatility 303. As is shown in FIG. 3, the far out end of the forward curve is affected only by the long ("L") move 301, and conversely the spot price is affected only by the short ("S") move 302. Under this model, the spot price is said to revert back to the far out price at a rate of $\beta$.

This model allows the description of the underlying assets in common situations where the spot price is more volatile than the far out price, and the spot price and the far out price are not perfectly correlated to each other.

A somewhat more complex example is the Long-Short-Fast ("LSF") model. Like the Gabillon Model, the LSF model has a long move 401 and a short move 402. In addition, the LSF model has a third, Fast factor 403. The Long factor can be mean reverting. This feature allows the description of the situation where the volatility of the far end of the forward curve does not approach a constant, but rather keeps decreasing as the forward time T increases. The third factor makes it possible to capture particularly high amounts of volatility and decorrelation at the spot price end of the curve. Taking the general option pricing model presented in Equation 1a, the following is an SDE derived for this model:

$$\frac{dF(t,T)}{F(t,T)} = g(T)[(e^{-\beta_L(T-t)} - e^{-\beta_S(T-t)})\sigma_L dz_L(t) + \quad \text{Equation 8}$$

-continued $$e^{-\beta_S(T-t)}\sigma_s(t)dz_s(t) + e^{-\beta_F(T-t)}\sigma_F(t)dz_F(t)]$$

Figure 4:
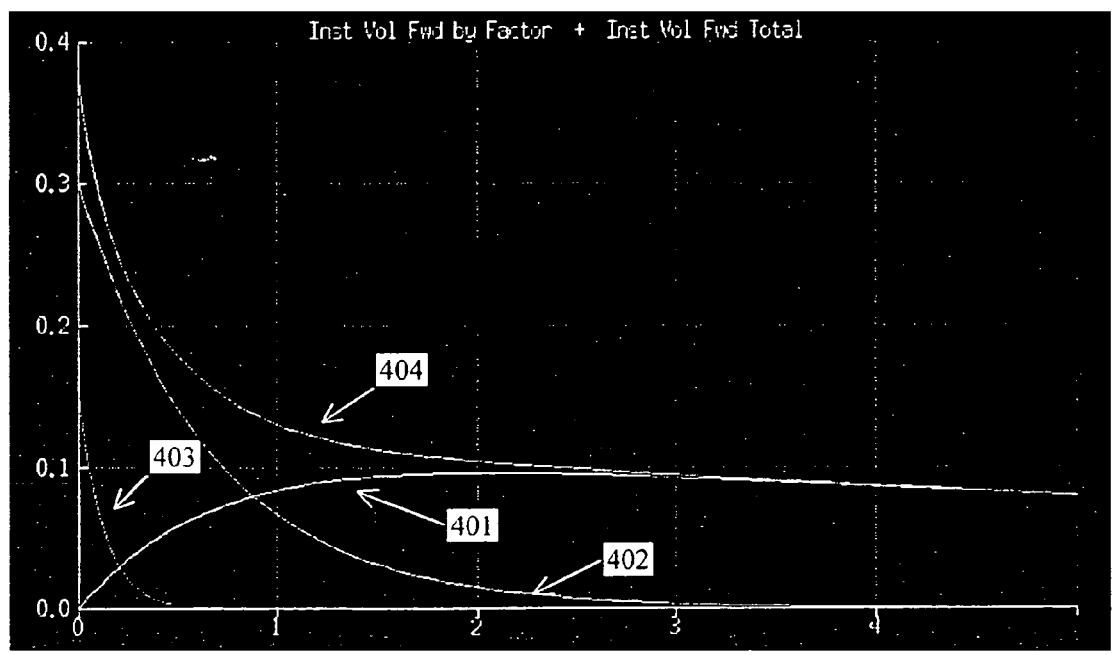
FIG. 4 illustrates the forward price moves and total instantaneous forward price volatility implied by the Long-Short-Fast type (3-factor) model design

FIG. 4 shows the factor volatility functions $(e^{-\beta_L(T-t)}-e^{-\beta_S(T-t)})\sigma_L dz_L(t)$ 401, $e^{-\beta(T-t)}\sigma_s(t)$ 402 and $e^{-\beta_F(T-t)}\sigma_F(t)dz_F(t)$ 403 for this model, as well as the resulting total forward price volatility 404.

Equation 8 is derived from Equation 1a using the following Move Shape Coefficients, $y_{ia}$:

$$y_{ia} = \begin{bmatrix} 1 & 0 & 0 \\ -1 & 1 & 0 \\ 0 & 0 & 1 \end{bmatrix} \quad \text{Equation 9}$$

In another embodiment, the approach described can also be used to price options that depend on any number of underlying assets, such as commodity prices, currency exchange rates, and interest rates, by using a combination of general option pricing models. Interest rates can be modeled using Equation 1a with the forward price curve, F(t, T), denoting a quotient of a discount factor and an infinitely far-out discount factor. Currency exchange rates can be modeled using a 1-factor non-meanreverting version of the general option pricing model. Finally, correlations between all the general option pricing models can be used to describe the interrelations between these models. This method can result in a coherent description of an option based on the prices of any number of underlying assets, such as commodity prices, currency exchange rates, and interest rate volatilities.

In another embodiment, the method for pricing an option presented can be performed on a computer. The computer can include a memory, a processor, and executable software residing in the computer memory. The software can be operative with the processor to price an option. The method includes configuring a general option pricing model with parameters to conform the model to a market behavior of an underlying asset. The model is then calibrated to the implied volatility data describing a current state of the market. Finally, the price of the option is calculated using this model.

Figure 5:
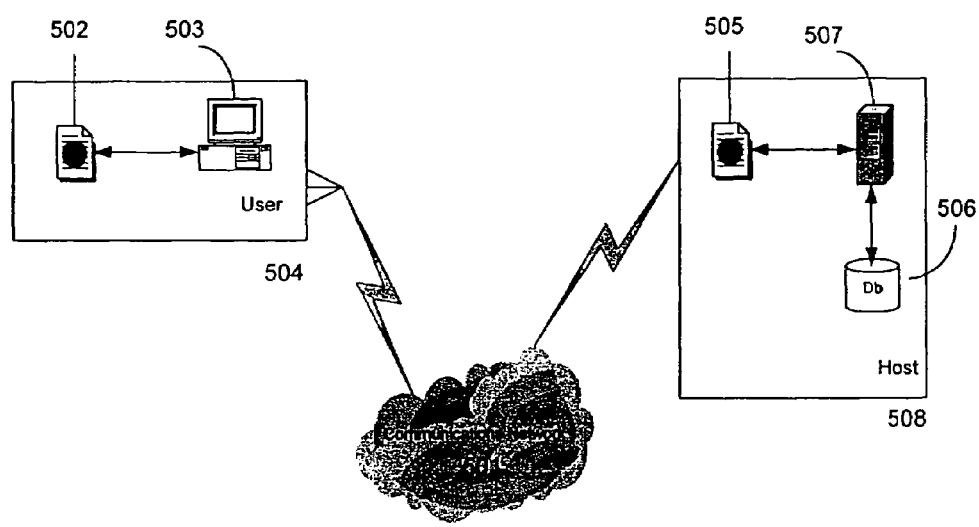
FIG. 5 shows a networkable computer system for modeling an option.

Referring now to FIG. 5, a networkable computer system for modeling an option is presented. A host system 508 includes a computer 507 and a database 506 for executing the method. The method includes configuring a general option pricing model with parameters to conform the model to a market behavior of an underlying asset. The model is then calibrated to the implied volatility data describing a current state of the market. Finally, the price of the option is calculated using this model. Multiple hosts can be used to distribute the modeling method. The database can be used to store information used to calibrate the model or store data necessary for the use of the model. Users 504 can communicate to the host through a communications network 501. The communications network 501 can include a network using a TCP/IP interface designed to work with the Internet. The users can interface to the host through a computer 503. The communications between the users and the host can commence through the use of web pages 502 and 505. Similarly, the communications can be sent through data signals over the communications network.

A number of embodiments of the present invention have been described. Nevertheless, it will be understood that various modifications may be made without departing from the spirit and scope of the invention. For example, computers 503 and 507 can include a personal computer executing an operating system such as Microsoft Windows™, Unix™, or Apple Mac OS™, as well as software applications, such as a web browser. Computers 503 and 507 can also be terminal devices, a palm-type computer WEB access device that adhere to a point-to-point or network communication protocol such as the Internet protocol. Other examples can include TV WEB browsers, terminals, and wireless access devices (such as a 3-Com Palm organizer). The computers 503 and 507 may include a processor, RAM and/or ROM memory, a display capability, an input device and hard disk or other relatively permanent storage. Accordingly, other embodiments are within the scope of the following claims.

What is claimed is:

1. A computer-implemented method for pricing an option comprising:
    (a) calculating in a computer the formula:

$$\frac{dF(t,T)}{F(t,T)} = \sum_a \left[ \sum_i y_{ia} B_i(t,T) g_i(T) \right] \sigma_a(t) dz_a(t),$$

wherein F(t, T) represents the value of the underlying asset and dF(t, T) represents a change in the value of the underlying asset;
   i represents an amount of mean reversion factors used in the model;
   t represents the current time;
   T represents the forward time;
   $y_{ia}$ represents the move shape coefficient;
   $B_i(t, T)$ represents the mean reversion factor;
   $g_i(T)$ represents the volatility adjustment factor;
   $\sigma_a(t)$ represents the instantaneous factor volatility; and
   $dz_a(t)$ represents the random increment;
   a represents the index enumerating the random increments $dz_a(t)$; and
    (b) calculating in a computer a price of an option based on the calculated results of the formula.

2. The method of claim 1, wherein the mean reversion factor further comprises the formula:

$$B_i(t,T) = \exp\left[-\int_t^T \beta_i(u)du\right],$$

wherein $\beta_i(u)$ represents a time dependency of a mean reversion rate.

3. The method of claim 1, wherein the instantaneous factor volatility further comprises the formula:

$$\sigma_a(t) = \sigma_{0a}(t) + \xi(t)d\sigma_a(t),$$

wherein $\sigma_{0a}(t)$ represents a base value for the instantaneous factor volatility;
   $\xi(t)$ represents a calibration coefficient; and
   $d\sigma_a(t)$ represents a calibration gradient determining how much each volatility is affected by the calibration coefficient.

4. A computer-implemented apparatus for pricing an option comprising:

(a) means for calculating the formula:

$$\frac{dF(t, T)}{F(t, T)} = \sum_{a}\left[\sum_{i} y_{ia}B_i(t, T)g_i(T)\right]\sigma_a(t)dz_a(t),$$

wherein F(t, T) represents the value of the underlying asset and dF(t, T) represents a change in the value of the underlying asset;

i represents an amount of mean reversion factors used in the model;

t represents the current time;

T represents the forward time;

$y_{ia}$ represents the move shape coefficient;

$B_i$(t, T) represents the mean reversion factor;

$g_i$(T) represents the volatility adjustment factor;

$\sigma_a$(t) represents the instantaneous factor volatility; and $dz_a$(t) represents the random increment;

a represents the index enumerating the random increments $dz_a$(t); and (b) means for calculating a price of an option based on the calculated results of the formula.

5. The apparatus of claim 4, wherein the mean reversion factor further comprises the formula:

$$B_i(t, T) = \exp\left[-\int_t^T \beta_i(u)du\right],$$

wherein $\beta_i$(u) represents a time dependency of a mean reversion rate.

6. The apparatus of claim 4, wherein the instantaneous factor volatility further comprises the formula:

$$\sigma_a(t) = \sigma_{0a}(t) + \xi(t)d\sigma_a(t),$$

wherein $\sigma_{0a}$(t) represents a base value for the instantaneous factor volatility;

$\xi$(t) represents a calibration coefficient; and $d\sigma_a$(t) represents a calibration gradient determining how much each volatility is affected by the calibration coefficient.

7. An article of manufacture for pricing an option, the article of manufacture comprising a computer-readable medium holding computer-executable instructions for performing the steps of:

(a) calculating in a computer the formula:

$$\frac{dF(t, T)}{F(t, T)} = \sum_{a}\left[\sum_{i} y_{ia}B_i(t, T)g_i(T)\right]\sigma_a(t)dz_a(t),$$

wherein F(t, T) represents the value of the underlying asset and dF(t, T) represents a change in the value of the underlying asset;

i represents an amount of mean reversion factors used in the model;

t represents the current time;

T represents the forward time;

$y_{ia}$ represents the move shape coefficient;

$B_i$(t, T) represents the mean reversion factor;

$g_i$(T) represents the volatility adjustment factor;

$\sigma_a$(t) represents the instantaneous factor volatility; and $dz_a$(t) represents the random increment;

a represents the index enumerating the random increments $dz_a$(t); and (b) calculating in a computer a price of an option based on the calculated results of the formula.

8. The article of manufacture of claim 7, wherein the mean reversion factor further comprises the formula:

$$B_i(t, T) = \exp\left[-\int_t^T \beta_i(u)du\right],$$

wherein $\beta_i$(u) represents a time dependency of a mean reversion rate.

9. The article of manufacture of claim 7, wherein the instantaneous factor volatility further comprises the formula:

$$\sigma_a(t) = \sigma_{0a}(t) + \xi(t)d\sigma_a(t),$$

wherein $\sigma_{0a}$(t) represents a base value for the instantaneous factor volatility;

$\xi$(t) represents a calibration coefficient; and $d\sigma_a$(t) represents a calibration gradient determining how much each volatility is affected by the calibration coefficient.

* * * * *